(12) United States Patent
Fenzy Peyre et al.

(10) Patent No.: US 9,524,408 B2
(45) Date of Patent: Dec. 20, 2016

(54) METHOD FOR MANAGING A MODE OF OPERATION OF A CONTACTLESS TAG AND CORRESPONDING TAG

(71) Applicants: Orange, Paris (FR); INVIA, Meyreuil (FR)

(72) Inventors: Caroline Fenzy Peyre, Nice (FR); Christophe Moreaux, Simiane Collongue (FR)

(73) Assignees: ISSM, Meyreuil (FR); ORANGE, Paris (FR)

( * ) Notice: Subject to any disclaimer, the term of this patent is extended or adjusted under 35 U.S.C. 154(b) by 23 days.

(21) Appl. No.: 14/411,810

(22) PCT Filed: Jun. 27, 2013

(86) PCT No.: PCT/EP2013/063568
§ 371 (c)(1),
(2) Date: Dec. 29, 2014

(87) PCT Pub. No.: WO2014/001477
PCT Pub. Date: Jan. 3, 2014

(65) Prior Publication Data
US 2015/0137954 A1 May 21, 2015

(30) Foreign Application Priority Data
Jun. 29, 2012 (FR) ................... 12 56290

(51) Int. Cl.
*G06K 7/10* (2006.01)
*G06K 19/073* (2006.01)
(Continued)

(52) U.S. Cl.
CPC ....... *G06K 7/10366* (2013.01); *G06K 19/0724* (2013.01); *G06K 19/07309* (2013.01); *G06K 19/0723* (2013.01); *G08B 13/2417* (2013.01)

(58) Field of Classification Search
CPC ............ G06K 19/0724; G06K 7/10366; G06K 19/07309; G06K 7/0008; G06K 19/0723; H04Q 5/22; G08B 13/2417
(Continued)

(56) References Cited

U.S. PATENT DOCUMENTS 5,467,081 A  11/1995 Drews et al.
6,753,759 B2 *  6/2004 Stegmaier .......... G08B 13/2417
                                                   340/10.5
(Continued)

FOREIGN PATENT DOCUMENTS

EP           1429301 A1    6/2004

OTHER PUBLICATIONS

International Preliminary Report on Patentability and English translation of Written Opinion dated Dec. 31, 2014 for corresponding International Patent Application No. PCT/EP2013/063568, filed Jun. 27, 2013.
(Continued)

*Primary Examiner* — Ali Neyzari
(74) *Attorney, Agent, or Firm* — David D. Brush; Westman Champlin and Koehler, P.A.

(57) ABSTRACT

A method is provided for managing the operating mode of an electronic tag, including at least one communication module for communicating with at least one control device and a memory for storing at least one tag identifier specific to the tag and transmittable by the tag to the at least one control device. The method includes, following reception of a deactivation instruction upon which the tag goes from an activated state to a deactivated state, a deactivation step, in which the transmission, to the control device, of the tag identifier is inhibited and in which the tag responds to a reactivation instruction by re-enabling the transmission of the tag identifier to the control device.

14 Claims, 3 Drawing Sheets

Figure 1A:
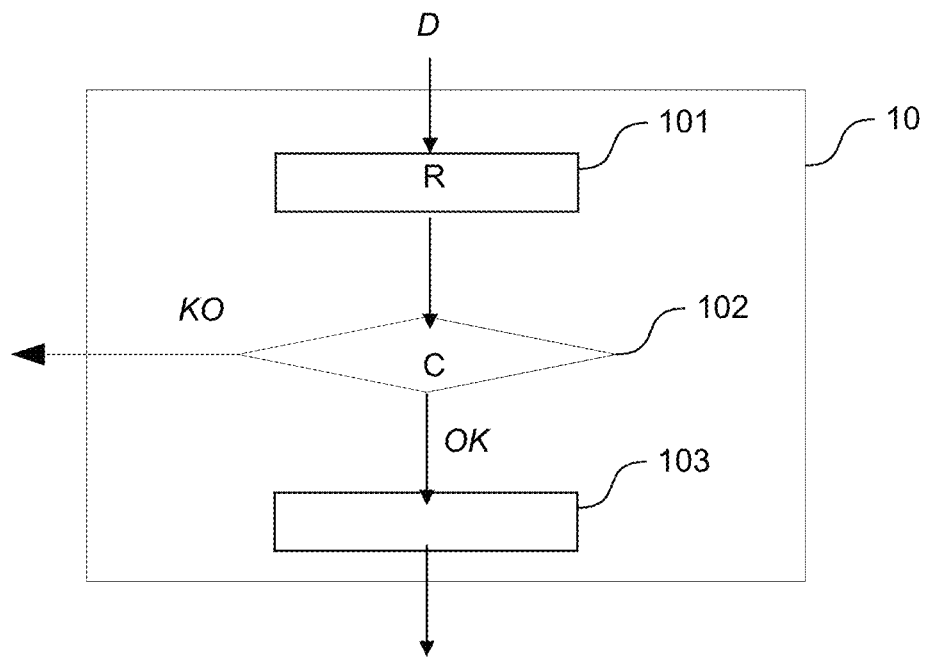

(51) Int. Cl.
*G08B 13/24* (2006.01)
*G06K 19/07* (2006.01)

(58) Field of Classification Search
USPC .................. 340/10.51, 10.5, 10.52, 10.34
See application file for complete search history.

(56) References Cited

U.S. PATENT DOCUMENTS

| | | | | |
|---|---|---|---|---|
| 7,176,784 | B2* | 2/2007 | Gilbert | G06K 7/0008 |
| | | | | 340/10.34 |
| 8,648,698 | B2* | 2/2014 | Alicot | G06K 7/0008 |
| | | | | 235/492 |
| 8,917,159 | B2* | 12/2014 | McAllister | G06Q 10/087 |
| | | | | 340/10.51 |
| 2002/0135478 | A1 | 9/2002 | Stegmaier et al. | |
| 2005/0156709 | A1 | 7/2005 | Gilbert et al. | |
| 2015/0137954 | A1* | 5/2015 | Fenzy Peyre | G06K 19/0724 |
| | | | | 340/10.5 |

OTHER PUBLICATIONS

French Search Report dated Apr. 17, 2013 for corresponding French Patent Application No. FR1256290, filed Jun. 29, 2012.
International Search Report and Written Opinion dated Sep. 3, 2013 for corresponding International Application No. PCT/EP2013/063568, filed Jun. 27, 2013.

\* cited by examiner

METHOD FOR MANAGING A MODE OF OPERATION OF A CONTACTLESS TAG AND CORRESPONDING TAG

CROSS-REFERENCE TO RELATED APPLICATIONS

This Application is a Section 371 National Stage Application of International Application No. PCT/EP2013/063568, filed Jun. 27, 2013, which is incorporated by reference in its entirety and published as WO 2014/001477 on Jan. 3, 2014, not in English.

1. FIELD OF THE INVENTION

The field of the invention is that of electronic tags, for example tags using contactless communications, especially RFID (Radio Frequency Identification) type tags, communicating in HF (high frequencies) and/or UHF (ultra high frequencies) to exchange data.

More specifically, the invention pertains to a mechanism for the deactivation/reactivation of such tags.

The invention finds application in all fields requiring the tracking of articles or objects such as for example commercially distributed articles or luxury items.

For example, the invention finds application in the entire supply chain for such articles (production, logistics, distribution, sales) up to the consumer level, hence up to the general public.

2. PRIOR ART

There is a known technique for deactivating such tags, which implements a command known as "kill" defined in the "EPCglobal gen2" standard used in the majority of UHF tags. Certain HF tags also have a "kill" command even if it does not form part of the HF standards.

The "kill" command makes the tag totally mute by the writing of a definitive status in the memory of the tag and is irreversible, i.e. it is impossible to restore communications with the tag.

Another technique of deactivation consists of the physical destruction of a part of the tag. In general, this is a destruction of the antenna/integrated circuit link of the tag which is done by tearing out a piece of the tag. The tag then becomes silent but the operation can be reversed by re-joining the integrated circuit to a new antenna. However, these rejoining means are not available to the final user of the tag.

Techniques also exist for protecting read access to a part of the memory of these tags. These are generally the part of the memory containing "user" data. Then, after presenting a password, an authorized user can restore access to this part of the memory. However, the unique identification number (UID or TID) of the tag cannot be protected because it is needed for the establishment of communications between the reader and the tag (the anti-collision phase). Not all the information contained in the memory of the tag therefore can be protected by this technique.

Finally, there also exists an "anti-theft" technique against the theft of articles carrying such tags, in the form of an EAS (Electronic Article Surveillance) function. This is a reversible function which can be activated and deactivated by an authorized user. The activation of the EAS function in a tag makes it respond to the "ALARM" command and the EAS can be deactivated when the article is sold for example. By contrast, this activation of the EAS does not enable protection of the data contained in the tag.

Thus, one drawback of certain known current techniques lies in the fact that they deactivate tags irreversibly, making them unusable.

Another drawback of other known, reversible methods lies in the fact that they cannot be used to mask all the data present in the tag. In particular, the UID remains visible, making it possible to track the tag and its carrier.

The main drawbacks of the prior-art techniques are therefore the non-reversibility of certain solutions and the fact that the identifiers are not deactivated for other solutions.

3. SUMMARY OF THE INVENTION

One particular embodiment of the invention proposes a method for managing the mode of operation of an electronic tag, comprising at least one communications module to communicate with at least one control apparatus and a memory serving to store at least one tag identifier, proper to said tag, capable of being transmitted by the tag to one said control apparatus.

According to this embodiment of the invention, the method comprises a step for deactivating, following the reception of a deactivation command, during which said tag passes from an activated state to a deactivated state in which the transmission, to a said control apparatus, of said tag identifier is inhibited and in which said tag responds to a reactivation command by again authorizing the transmission of this tag identifier to said control apparatus.

Thus, the invention relies on a mode of management of the operation of an electronic tag enabling it to be deactivated reversibly so as to inhibit access to the identifier of the tag, which is a unique identifier, proper to this tag and serving to distinguish it from other tags.

The tag which, in this way, can no longer be distinguished from another tag by an external control apparatus external to this tag is somewhat "anonymized": its identifier, made inaccessible by the tag itself, cannot be transmitted by this tag towards a control apparatus (of the tag reader or other type). The tag therefore cannot be used for an application and/or a service requiring knowledge of this tag identifier, for example an application and/or a service that might communicate with this tag on the basis of this tag identifier and/or localize this tag via this tag identifier.

In the deactivated mode, also called the secured mode, the tag identifier is no longer accessible in read/write mode but the tag is not completely unusable, because it can respond to a command enabling it to be reactivated, thus making it possible to use it again, unlike in the prior art techniques.

According to one particular characteristic, the step for deactivating comprises the following sub-steps:
  receiving a deactivation command comprising at least one status identifier, called a substitution identifier, and a deactivation password;
  comparing said deactivation password with a reference deactivation password;
  if said comparison sub-step is positive:
    writing said substitution identifier to a field of data representing the deactivated or non-deactivated state of the tag;
    updating rights of read and write accessibility of at least one part of said memory of said tag containing the tag identifier and updating rights of response of the tag to the commands received, applicable in the deactivated state of said tag.

Thus, according to this particular embodiment of the invention, the deactivation of the tag consists in receiving a deactivation command in a first stage, this deactivation command comprising a deactivation password and a non-unique identifier of the tag, called a substitution identifier.

The deactivation password secures the deactivation, i.e. it is used to verify that the passage of the tag from an activated state to a deactivated state is authorized.

Thus, in a second stage, this password accompanying the deactivation command is compared with a reference password stored in the memory of the tag. If the comparison is positive, then the deactivation command is validated and the substitution identifier is memorized in a third stage, in the memory of the tag, to mark the validation of the secured mode. In addition, the rights of access to the different memory zones that are to be made "invisible" in the deactivated state are modified (no read and write access to the memory zone comprising the tag identifier of the tag, and the same, as the case may be, for the memory zone comprising user data and/or the memory zone comprising the ePC code).

Besides, this substitution identifier does not make it possible to identify this tag or to localize it uniquely, unlike with the associated tag identifier classically associated with the tag in the activated state.

The recorded substitution identifier can then be used to determine whether the tag is in the activated state or else in the deactivated state: its presence in memory, in the place of a default value (zero value for example) makes it possible for example to detect that the tag is in the deactivated state.

According to one particular aspect of the invention, the step for deactivating comprises a sub-step of transmission, by said tag, of a reactivation password to an apparatus sending said deactivation command.

Thus, for reasons of security, the password which will serve for the subsequent reactivation of the tag is given by the tag itself, the data sent by a tag being more difficult to "snoop on" than the information transmitted to the tag.

According to one particular characteristic of the invention, the substitution identifier is transmitted by the tag instead of said tag identifier in a response to a command received in the deactivated state.

According to one particular aspect, the invention comprises a step for reactivating during which said tag passes from the deactivated state to the activated state, said step for reactivating comprising the following sub-steps:
  receiving a reactivation command comprising at least one reactivation password;
  comparing said reactivation password with a reference reactivation password;
  if said comparison sub-step is positive:
    writing, to a data field representing the deactivated or non-deactivated state of the tag, of a value representing the activated state of said tag;
    updating the rights of accessibility in read and write mode of at least one part of said memory containing the tag identifier and updating rights of response of the tag to the received commands, applicable in the activated state of said tag.

Thus, according to this embodiment of the invention, a deactivated tag can be reactivated in a secured manner by means of a password. As in the case of the deactivation, this password is compared with a reference reactivation password, stored in the memory of the tag.

Then, the different other memory zones that have to be accessible in activated mode are made again accessible (for example the tag identifier and, if such a zone exists, the memory zone containing the data proper to the user).

In addition, the tag can again respond to any type of command, as defined in an activated operating state.

Once reactivated, the tag is "visible" (its content is accessible) and communicating (it can respond normally to the demands of a control apparatus).

In particular, the step for reactivating comprises a step for the transmission of a deactivation password by said tag to an apparatus sending said reactivation command.

According to one particular embodiment of the invention, the tag is configured to communicate via a first channel and via a second channel, said deactivation being a selective deactivation of a communications mode using the first channel and in which, in the deactivated state, the transmission of said at least one tag identifier to a said control apparatus is inhibited, via the first channel and authorized via the second channel, and said tag responds to a reactivation command received via the second channel in again authorizing the transmission of said at least one tag identifier via the first channel.

Thus, according to this particular embodiment of the invention in which the RFID tag can communicate along two channels, for example in HF and/or in UHF, the method for managing the mode of operation of the tag makes it possible to manage the selective deactivation of at least one of the two communications modes.

In this way, this embodiment of the invention makes it possible for example to deactivate the tag only in UHF so as to prevent the tracking of the tag by long-distance readers, for example for articles in exit from the factory, while enabling this tag to be tracking at short range by HF, for example for the same articles inside the plant.

According to one particular aspect, the step for deactivating can be triggered following the reception of a deactivation command received via the first channel or via the second channel.

According to one particular characteristic of the invention, in the deactivated step, said tag responds to no command received via the first channel.

In particular, the step for deactivating comprises the following sub-steps:
  receiving a deactivation command comprising at least one status identifier proper to the first channel, denoted as the first substitution identifier, and a deactivation password proper to the first channel;
  comparing said deactivation password proper to the first channel with a reference deactivation password proper to the first channel;
  if said comparison sub-step is positive:
    writing said first substitution identifier to a data field representing the deactivated or non-deactivated state of the communications mode using the first channel;
    updating the rights of read and write accessibility of at least one part of said memory of said tag containing the first tag identifier and updating the rights of response of the tag to the commands received via the first channel, applicable in the deactivated state.

According to one particular aspect of the invention, the method comprises a step for reactivating during which said tag passes from the deactivated state to the activated state, said step for reactivating comprising the following sub-steps:
  receiving a reactivation command sent via the second channel by a control apparatus, said reactivation command comprising at least one reactivation password proper to the first channel;
  comparing said reactivation password proper to the first channel with a reference reactivation password proper to the first channel;
  if said sub-step for comparing is positive:

writing a value representing the activated state of said tag to a data field representing the deactivated or non-deactivated state of the communications mode using the first channel;

updating the rights of read and write accessibility at least one part of said memory of said tag containing the first tag identifier, and updating the rights of response of the tag to the commands received via the first channel, applicable in the activated state of said tag.

Thus, according to this particular embodiment of the invention, the method for managing the mode of operation of the tag enables a tag to be made totally mute and invisible in one of the two modes of communication, through the second mode of communication which can be used to reactivate the tag.

For example, the tag can be deactivated totally in UHF mode, i.e. it no longer responds to any command and does not enable access to any of its memory zones and can be reactivated through the HF communications mode which is still in operation.

In this case, the HF mode can even be deactivated according to one of the particular embodiments presented here above, namely by enabling the reactivation by a unique command and by means of the substitution identifier accessible in memory.

According to one particular aspect of the invention, said memory serving to store also user data, liable to be transmitted by the tag to a said control apparatus, in the deactivated state, the transmission to a said control apparatus of said user data is inhibited.

Thus, the deactivation of the tag inhibits the transmission of user data stored in the memory of the tag, thus securing this data.

The invention, in one particular embodiment, also pertains to an electronic tag comprising:

at least one communications module to communicate with at least one control apparatus, a memory serving to store at least one tag identifier proper to said tag, liable to be transmitted by the tag to a said control apparatus, a deactivation module configured so that, following the reception of a deactivation command, it makes the tag pass into a deactivated state by inhibiting the transmission to a said control apparatus of said at least one tag identifier, and a reactivation module configured so that, following the reception of a reactivation command, it makes the tag pass into an activated state by authorizing the transmission to a said control apparatus of said at least one tag identifier.

According to one particular aspect of the invention, the tag comprises at least one communications module to communicate via a first channel and via a second channel, the deactivation module being configured to make the tag pass into a deactivated state in inhibiting the transmission of said at least one tag identifier, via the first channel, to a said control apparatus and in authorizing the transmission of said tag identifier, via the second channel to a said control apparatus, the reactivation module being configured so that, following the reception of a reactivation command received via the second channel, it makes the tag pass into an activated state in authorizing the transmission of said at least one tag identifier, via the first channel, to a said control apparatus.

4. LIST OF FIGURES

Figure 1B:
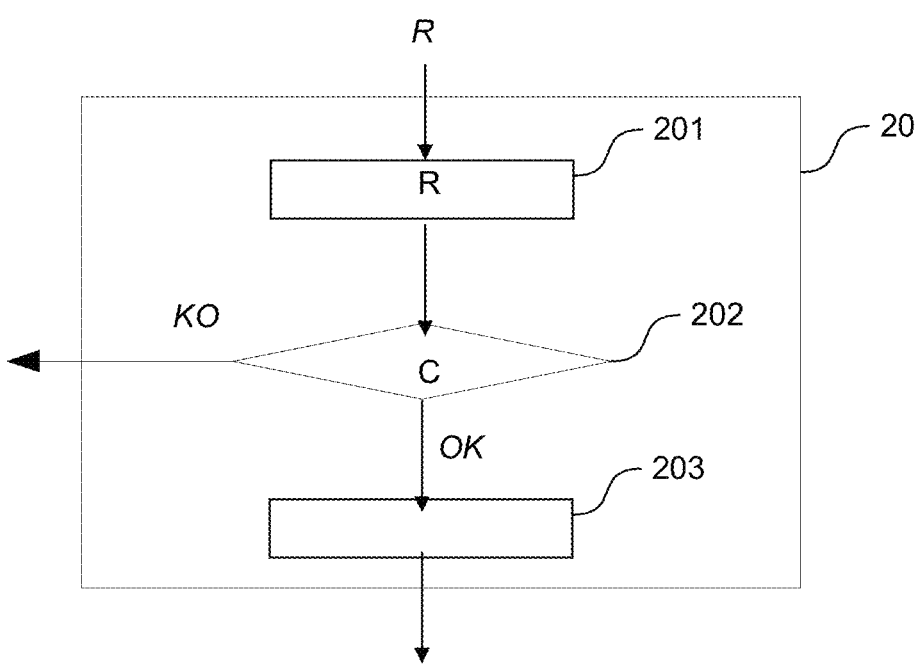
Figure 2A:
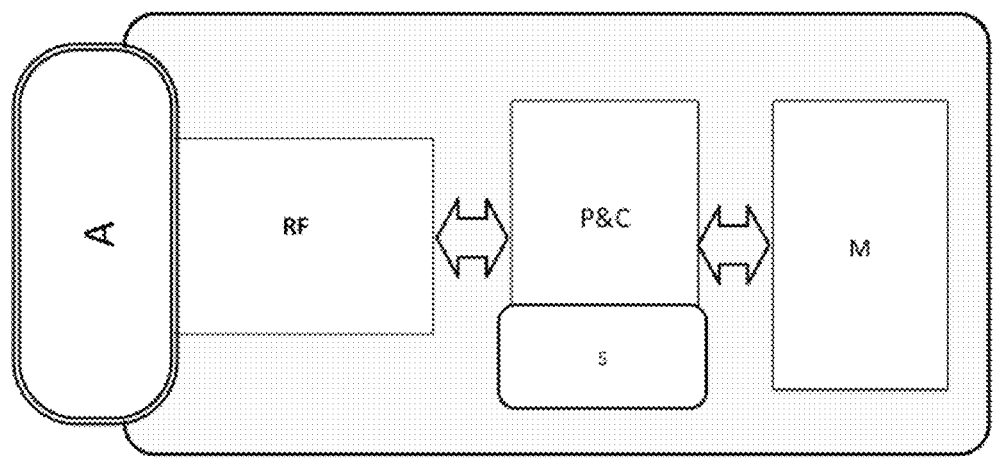
Figure 2B:
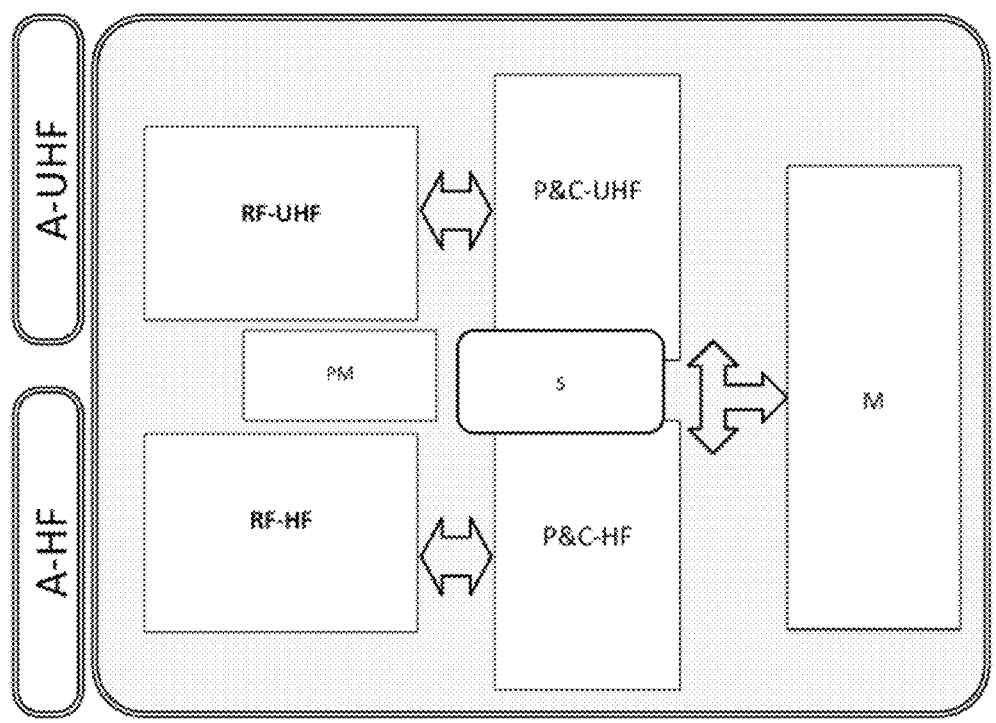
Figure 3:
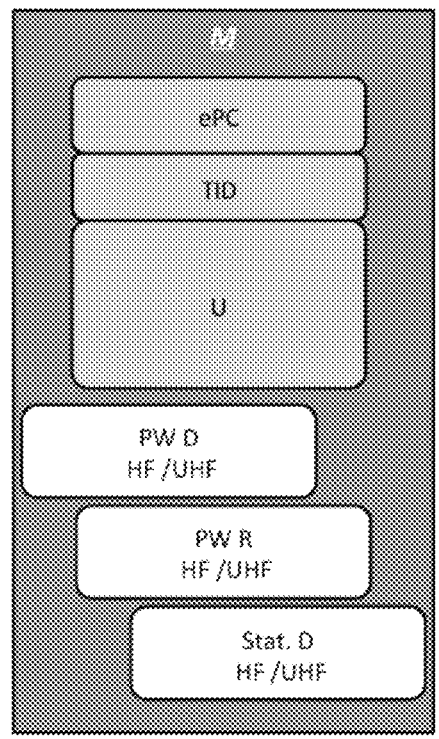
Figure 4:
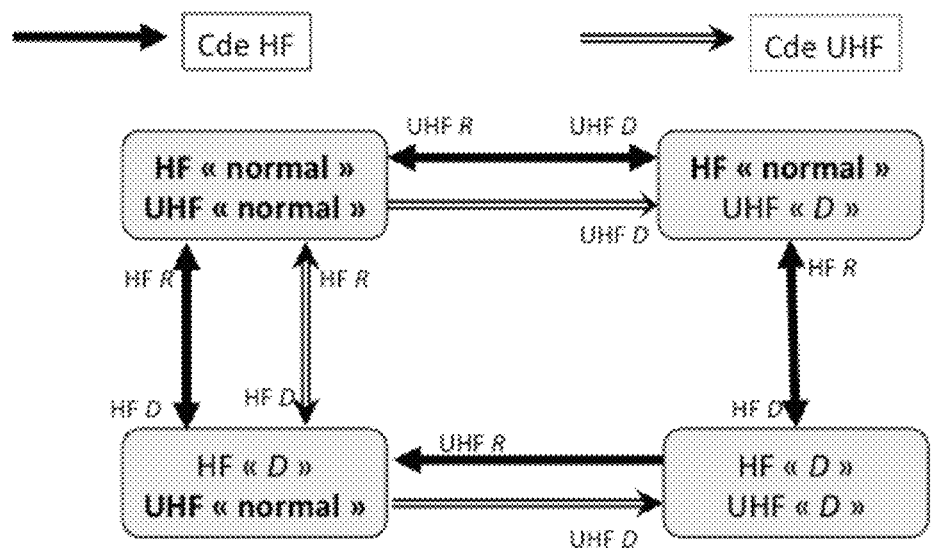

Other features and advantages of the invention shall appear more clearly from the following description of one particular embodiment given by way of a simple, illustratory and non-exhaustive example, and from the appended drawings, of which:

FIGS. 1a and 1b illustrate the main steps of the method of management of the mode of operation of an RFID tag according to a first particular embodiment of the invention;

FIGS. 2a and 2b present two examples of RFID tags respectively according to two particular embodiments of the invention;

FIG. 3 presents an example of a memory of a tag according to a second particular embodiment of the invention;

FIG. 4 illustrates an example of operation of a tag according to a second particular embodiment of the invention.

5. DESCRIPTION OF ONE EMBODIMENT OF THE INVENTION

5.1 General Principle

The invention is described in the case of its application to an RFID contactless tag, but its principle of deactivation/reactivation can also be applied to electronic tags using other modes of communication.

The electronic tag presents a memory zone for the storage of a tag identifier (UID) proper to said tag, liable to be transmitted by the tag to a control apparatus.

This identifier is unique, in that no other tag is identified by this same identifier when a given communications channel is used (for example the UHF channel or the HF channel). However, when the tag is capable of communicating via two distinct communications channels (UHF and HF for example), two distinct tag identifiers (for example one of the ePC type and the other of the UID/TID type) are stored in the memory of the tag. Each of these two tag identifiers can be transmitted to a control apparatus via one or the other of these two channels, for example in response to a read command of this identifier or in response to another command.

The general principle of the invention relies on the reversible deactivation of an RFID type tag enabling it to be deactivated:

by inhibiting the transmission to a control apparatus, via a communications channel, of all or part of the data stored in the memory of the tag, especially user data and tag identifiers, by authorizing the tag to respond in its deactivated state to at least one specific reactivation command.

Indeed, this deactivation leads to a modification of the state of the tag, marking it as being deactivated, and enables a protection of data in memory as well as behavior in restricted mode of the tag for any command other than the specific reactivation command.

5.2 Description of a First Embodiment

Referring now to FIG. 1a, a first particular embodiment of the invention for the deactivating a tag is presented.

A step 10 for deactivating a tag is implemented upon reception, during a reception step 101, of a deactivation command D sent by a control apparatus, for example a remote reader capable of communicating with a tag via at least one communications channel, for example UHF and/or HF. Such a control apparatus can read or write data to the tag by sending an appropriate command: when this command is processed by the tag, a reading or writing operation for reading or writing at least one of these pieces of data is activated by the tag. This operation can either be explicitly requested or be implicitly necessary to process the received command.

This deactivation command D comprises, according to this embodiment of the invention, at least one deactivation password and one status identifier, here below denoted as a substitution identifier, distinct from the unique identifier (UID) already assigned to the tag but capable of being transmitted by the tag instead of the unique identifier (UID) when the tag is in the deactivated state.

Unlike the unique identifier, the substitution identifier is generally not proper to a tag. It can be common to several deactivated tags. It represents the deactivation state of the tag.

A comparison sub-step 102 is used to validate this deactivation command by comparing the deactivation password that is transmitted with the deactivation command with a deactivation reference password stored for example in a part of the memory of the tag.

Thus, the deactivation of a tag is not accessible to any reader capable of communicating with this tag but corresponds to a function reserved, via the knowledge of a password, to a reader or to a restricted number of readers according to the needs of use of the tag.

For example, if such tags are positioned on the articles during their manufacture, or at the exit from the fabrication chain, with a view to traceability, it may be necessary to deactivate these tags at certain times during the transit of these articles, for example at the point of exit from a warehouse to prevent snooping. By contrast, it is preferable that the deactivation of the tags should be controlled and therefore validated through the use of a password. Obtaining this deactivation password by the reader is described here above with reference to the step for reactivating of the tag.

Thus, if the comparison between the deactivation passwords is negative, then the tag cannot take deactivated.

If not, the deactivation is implemented in a sub-step 103, comprising especially the writing of the substitution identifier transmitted with the deactivation command to a specific part of the memory comprising an information field representing the deactivated state or non-deactivated state of the tag. This information field is accessible by a control apparatus in read mode at least in the deactivated state so that the deactivated state of the tag can be detected by reading this field and so that the substitution identifier can be used in the deactivated state instead of the unique identifier.

Thus, in the deactivated state, this information field has a specific status information, usable for example during the reactivation of the tag (as described here below) which prevents the traceability of the tag, because this identifier contained in this information field is not unique, thus fulfilling one of the deactivation criteria, namely making it impossible to trace the tag.

This substitution identifier can correspond to a predetermined value for all the deactivated tags or else to one predetermined value among a plurality of predetermined values for the deactivated tags. This substitution identifier however is not unique so as not to allow a deactivated tag to be traced.

This step 103 also enables the updating of the rights of access to certain pieces of data stored in the memory of the tag, in prohibiting especially read and write access by a control apparatus to user data as well as to the unique identifier (UID) of the tag, thus fulfilling another criterion of deactivation, namely the securing of the data stored in the tag.

As described here below, the memory of the tag can be partitioned into different zones, these zones being made independently accessible or non-accessible in the activated state of a tag, according to the requirements of use.

Finally, this step 103 defines the rights of response of the tag to the commands received by the tag, for example so as to restrict the possibilities of interrogation of the tag and the operation of this tag. The description here below shall refer to the restricted mode.

Two variants A1 and B1 are possible for this restricted mode:
 in the restricted mode A1, the tag responds to no command except to a specific reactivation command;
 in the restricted mode B1, the tag responds to at least one command other than a reactivation command but does so in sending back deteriorated data, error codes and default values, zero values instead of the real values, etc.

Here again, the rules of response to the commands can be adapted to the requirements of use, for the deactivated state of the tag.

Thus, if we consider for example an RFID tag working in HF mode, when this tag is deactivated and enters an HF field, its deactivated state can be detected by reading the information field containing the substitution identifier, this field remaining accessible to a control apparatus in read mode. The writing of the information field is always possible by means of the reactivation command.

In the deactivated state, the sensitive pieces of data such as the unique identifier UID or the user data are inaccessible in read and write mode by a control apparatus: i.e. the tag does not respond to any command aimed at modifying or reading the data or sending back a response containing all or part of this data. Thus, the transmission of this data in response to a command sent out by a control apparatus is inhibited.

By contrast, the access control data including:
 the data defining the rights of access to the sensitive data (the unique identifier UID and the user data),
 the data defining the rights of response to the commands are accessible in read and write module by a control apparatus (by means of the reactivation command) in the deactivated state just as in the activated state in order to be able to control access to data in these two states, provided that a password if any, required for such a command and/or for operation in read or write mode, is available.

In addition, in the deactivated state, the tag responds only to a specific reactivation command, the other commands being ignored or treated in a downgraded manner.

Such a deactivated tag, according to this particular embodiment of the invention, therefore cannot be uniquely located and cannot be identified (because its unique identifier is no longer accessible, and the substitution identifier is not unique).

Referring now to FIG. 1*b*, we present the main steps of the reactivation of a deactivated tag, according to this first particular embodiment of the invention.

A step 20 for reactivating a tag is implemented upon the reception, in a reception step 201, of a reactivation command R sent by a control apparatus, for example a remote reader, capable of communicating with the tag via at least one communications channel.

In this embodiment of the invention, the activation command R comprises at least one reactivation password.

According to a first alternative embodiment of the invention, this reactivation password is written preliminarily to deactivation in the memory of the tag, for example during a customizing phase, following the reception by the tag of a command containing this password.

According to a second alternative embodiment, this reactivation password is generated (for example randomly) by the tag during its initialization or during the deactivation, before it is automatically written to the memory of the tag. In this case, the tag sends the reactivation password in response to a deactivation command. This variant reinforces the security of these functions of deactivation/reactivation of a tag, because the response to a command coming from a tag is more difficult to snoop on than a command transmitted to the tag.

A table of correspondence between reactivation passwords and deactivated identifiers can be maintained by the reader.

Thus, on the same principle, a deactivation password, for future deactivation, can be transmitted to the reader in response to a reactivation command. In this case, the tag generates a deactivation password, stores it in its memory as a reference deactivation password and transmits it to the reader.

A comparison sub-step 202 is used to validate the reactivation command by comparing the reactivation password that is transmitted with the reactivation command with a reactivation reference password stored for example in a part of the memory of the tag.

Thus, as in the case of the deactivation, the reactivation of a tag is not accessible to any reader capable of communicating with this tag but corresponds to a function reserved, through knowledge of a password, to one reader, or to a restricted number of readers, according to the requirements of use of the tag.

For example, if such tags are positioned on articles during their manufacture or when they exit the production line, with a view to traceability, it can however be necessary to deactivate these tags for reasons of privacy protection when the article is sold. By contrast, it is very useful to be able to reactivate such tags, for example when the consumer brings the article back for exchange or reimbursement and when the article is back in circulation. In this case, it is preferable for this reactivation to be controlled and therefore validated by the use of a password.

Thus, if the comparison of reactivation passwords is negative, then the reactivation of the tag cannot take place.

If not, the reactivation is implemented in a sub-step 203 comprising especially the writing of a predetermined value, (for example zero) representing the activated state of the tag, to a specific information field of the memory dedicated to the state of the tag.

Thus, the specific information field of the tag has a value representing the activated state of the tag differentiating it from a deactivated tag. For example, this value is a zero value or a predetermined non-zero value.

This step 203 also makes it possible to update the rights of access to data stored in the memory of the tag, in again permitting for example read and write access, for a control apparatus, to the user data as well as read access to the unique identifier (UID) of the tag.

Finally, this step 203 is used to define the rights of response to the commands received by the tag so as to permit the tag to respond again to all the commands that it receives.

This step for reactivating 20 thus puts the tag back in an activated state as before a deactivation.

Referring to FIG. 2*a*, we present an example of the architecture of an RFID tag according to this particular embodiment of the invention, comprising an antenna A and an integrated circuit comprising three main parts:

- a radiofrequency interface RF (also called a "Front-end" interface), connected to the antenna and used especially to carry out the functions of RF communications and energy recovery,
- a P&C module for the digital control of the protocol and of the functions to interpret the commands received by the RF interface and execute them,
- an additional security module S used especially to implement the functions of deactivation/reactivation of the tag according to any one of the particular embodiments of the invention,
- a non-volatile memory M used to store the user data or system data.

A tag having such an architecture is capable especially of implementing the steps of the method according to the invention according to any one of the particular embodiments described here above. Such a tag communicates in HF or in UHF and implements the communications protocols and the commands pertaining to the respective HF or UHF standards. Similarly, the memory of such a tag is implemented according to the respective HF and UHF standards (for example the HF protocol does not define the particular constraints for the memory contrary to the UHF protocol which dictates a certain partitioning of the memory).

5.3 Description of a Second Embodiment

Another architecture of an electronic tag is proposed here below with reference to FIG. 2*b*.

Such an electronic architecture is a bi-frequency tag which, according to this second particular embodiment of the invention, communicates according to two distinct communications channels, i.e. in HF on the one hand and in UHF on the other hand.

To this end, such a tag has communications means to communicate independently via these two communications channels: two antennas A-HF and A-UHF, connected to the integrated circuit by two interface modules RF-UHF and RF-HF. The integrated circuit furthermore comprises:

- two modules, P&C-UHF and P&C-HF, for the digital control of the protocol and of the functions used to interpret the commands received by the interfaces RF-UHF and RF-HF and to execute them respectively for the UHF mode and the HF mode. In the particular case of this embodiment, the two modules P&C-UHF and P&C-HF are grouped together in a same module, the processing of the commands received via either of the interface modules RF-UHF and RF-HF being done in this common module. This can be the case for example in the ePC global gen2 standard describing a UHF and HF implementation,
- a security module S making it possible especially to implement the functions of deactivation/reactivation of the tag according to any one of the particular embodiments of the invention,
- a non-volatile common memory M used to store the user data or systems data for the two modes, namely the UHF and HF modes.

Such a tag has the particular feature of having only one memory, common to both communications modes HF and UHF, unlike the known "bi-frequency" tags, which have two distinct integrated circuits for each of the two modes of communication and therefore two distinct memories.

Such a tag makes it possible therefore to facilitate exchanges between the digital control modules and the single memory M as well as exchanges between the security module S and the memory M.

For example, such a single memory M is illustrated in FIG. 3 according to this second particular embodiment of the invention.

So as to be compatible with the constraints of memory partitioning required by the UHF protocol, the memory M has a plurality of zones, each dedicated to one type of data.

For example, one zone is dedicated to the unique ePC (electronic product code), another zone to the unique identifier TID, and another zone U for user data.

Besides, according to this second particular embodiment, three additional zones are needed in order to store the HF and UHF deactivation passwords (PW D HF/UHF), the HF and UHF reactivation passwords (PW R HF/UHF) and the HF and UHF deactivation states (Stat. D HF/UHF).

Different methods of deactivation/reactivation of this bi-frequency tag shall be described. In this description, reference shall be made without distinction to the deactivation/reactivation of a part of the tag (UHF, HF), a mode of communication (UHF, HF) or a communications channel (UHF, HF).

Each of the two parts HF and UHF (and the associated communications mode or communications channel) of a bi-frequency tag as presented here above, with reference to FIGS. 2b and 3, can be deactivated/reactivated independently of each other in using the methods of the first embodiment described with reference to FIGS. 1a or 1b.

When a part/communications mode/communications channel is deactivated, a functional restriction is imposed on this part/this communications mode/this communications channel.

Three modes of functional restriction are possible for a communications channel in the case of a tag with two communications channels:

- in a restricted mode A2, the tag does not respond to any command received via this communications channel, except for a specific reactivation command: the tag is said to be partially mute for this channel/communications mode,
- in a restricted mode B2, the tag responds to at least one command, received via this communications channel, other than a reactivation command but does so in sending back degraded data (zero value or another default value, error codes, etc),
- in a restricted mode C2, the tag is totally mute for this channel/communications mode: it responds to no command received via this communications channel, not even to a reactivation command.

In addition, the two HF and UHF parts can be deactivated, by deactivating one part and then the other with one of the functional restrictions described here above.

Owing to the presence of two modes/communications channels, it is possible to make one tag part completely mute and to use the other tag part for the reactivation of the completely mute part. However, it is not possible to make both tag parts completely mute.

The following combinations are therefore possible:

- the first deactivated part goes into restricted mode C2, i.e. it becomes completely mute on the communications channel associated with this first part, and then the second deactivated part goes into restricted mode A2 or B2, and the reactivation of either part can be done only through a communications channel associated with one part which is not completely mute at the time of this reactivation;
- the first deactivated part goes into restricted mode A2 or B2, and then the second deactivated part goes into restricted mode A2 or B2, and the reactivation of either part can be done via the communications channel of either part since neither of them is completely mute at the time of this reactivation;
- the first deactivated part goes into restricted mode A2 or B2, and then the second deactivated part goes into restricted mode C2, i.e. it is completely mute on the communications channel associated with this second part; the reactivation of either part can be done only via a communications channel associated with a part which is not completely mute at the time of this reactivation.

When a tag part is totally mute (restricted mode C2) in being deactivated for a mode/communications channel, the reactivation of this part is impossible via this mode/communications channel. When a tag part has a restricted operating mode A2 or B2, the reactivation of this part is possible via this communications mode.

In this second particular embodiment of the invention, it is possible to indicate the desired functional restriction A2, B2 or C2 to the tag during its deactivation. This will be a totally mute tag if the reactivation is impossible via this communications mode or it will be a restricted operation if the reactivation is possible via this communications mode.

A more specific embodiment consists in imposing a different type of functional restriction for each mode of communications.

In the following description, a deactivation was chosen for the UHF communications mode that makes the tag totally mute (restricted mode C2) and a deactivation in restricted operating mode A2 or B2 was chosen for the HF communications mode. In this case, the reactivation is possible only by the HF communications channel.

The roles of the UHF and HF parts are however completely interchangeable: deactivation in restricted mode C2 for the HF part and deactivation in restricted mode A2 or B2 for the UHF part. The entire description that follows can be transposed by inverting the roles of the UHF and HF parts.

FIG. 4 illustrates an example of an embodiment of the second particular embodiment of the invention, in which any one of the HF and UHF parts of a bi-frequency tag as presented here above, with reference to FIGS. 2b and 3 or both parts of this bi-frequency tag can be deactivated/reactivated.

The deactivation of the first UHF part is done by using any one of these two communications channels. By contrast, the reactivation of this UHF part can be performed only by using the HF communications channel mode for which the tag is not completely mute.

The deactivation of the first part (UHF) that is to become completely mute is done by means of a deactivation command sent on either of the UHF or HF channels. Then, a deactivation of the second part (in the chosen example, the HF part) can be done as a complement: since no command can be received and processed if it is transmitted to the completely mute part, the deactivation command for deactivating the first part will necessarily be done by sending a deactivation command via the second communications channel and will be processed by the second part. For this second part, a functional restriction will be implemented and it will be the restricted mode A2 or B2.

In particular, a bi-frequency RFID UHF-HF tag according to this second particular embodiment of the invention can be positioned on different commercially distributed articles, or luxury goods or branded items and can even be placed at the very beginning of the supply chain (production, logistics, distribution, sales) and up to the consumer, and hence the general public.

For example a manufacturer, having placed such RFID tags on these articles to facilitate his inventory management and the management of the dispatching logistic flows, may wish to deactivate the UHF part (long-distance reading) of the tags of each article at the exit from his warehouses in order to avoid espionage on his output while at the same time leaving the HF part (long-distance reading) activated. By contrast, he might wish to reactivate the UHF communications mode of these tags at the time of distribution of the articles.

Besides, at present, in the distribution sector, it is recommended that, after purchase, it should be possible to deactivate both the HF and the UHF part of the RFID tag on the purchased article if the consumer wishes it. Now, since many articles can be brought back to the sales point by the consumer for exchange or reimbursement, it is indispensable to make this deactivation reversible, according to any one of the particular embodiments of the invention.

The bi-frequency tag has a set of data in memory proper to the first part/first communications mode/first communications channel (for example UHF), this set comprising:
  an information field CH1 comprising a value V1 representing the deactivated or non-deactivated state of the first communications mode;
  access control data comprising:
    a deactivation password MDPD1 for the deactivation of the first communications mode;
    a reactivation password MDPR1 for the reactivation of the first communications mode.

Similarly, this tag has a set of data in the memory proper to the second part/second communications mode/second communications channel (in the chose example, HF), this set comprising:
  an information field comprising a value V2 representing the deactivated or non-deactivated state of the second mode of communications;
  access control data comprising:
    a deactivation password MDPD2 for the deactivation of the second communications mode;
    a reactivation password MDPR2 for the reactivation of the second communications mode.

The bi-frequency tag comprises data in memory common to the first and second parts, accessible via both the first and the second channel, including:
  user data,
  a unique identifier ID1, proper to the tag, liable to be transmitted via the first or the second communications channel to a control apparatus,
  a unique identifier ID2, proper to the tag, liable to be transmitted via the first or the second communications channel to a control apparatus.

Thus, in the second embodiment of the invention, the tag can be in four different states, represented in FIG. 4:
  a first state, called an activated state or "normal state" of the tag, in which the two HF and UHF parts are activated (HF "normal", UHF "normal") with:
    response to any command, whether it is received via the UHF channel or the HF channel;
    a value representing the activated state is equal to zero, in the information field CH1 proper to the first UHF communications mode,
    a value representing the activated state is equal to zero, in the information field CH2 proper to the second HF communications mode,
    the common data (user data, tag identifiers) accessible in read mode being possibly obtained by a control apparatus sending a command via the UHF or HF channel;
  a second state, called a deactivated first state, in which only the UHF part is deactivated, totally mute and the HF part is activated (HF "normal", UHF "D") with:
    no response on the UHF channel, whatever the command received via the UHF channel;
    response to any command received via the HF channel, including a command for reactivation of the UHF channel, provided however that the password given is correct;
    value of the information field CH1 equal to a substitution identifier given with the command for deactivating the UHF part,
    a value representing the activated state of the HF part in the information field CH2,
    the common data (user data, tag identifiers) accessible in read mode being possibly obtained by a control apparatus sending a command via the HF channel, but the transmission of which is inhibited via the UHF channel;
  a third state, called a second deactivated state, in which the HF part only is deactivated and the UHF part is activated (HF "D", UHF "normal"):
    restricted mode of operation A2 or B2 via the HF channel; the only command that can be interpreted by the HF channel is a command for reactivating the HF part;
    response to any command via the UHF channel, including a command for reactivating the HF channel provided however that the password provided is correct;
    the value of the information field CH2 equal to a substitution identifier provided with the command for deactivating the HF part,
    a value representing the activated state of the UHF part equal to zero in the information field CH1,
    the common data (user data, tag identifiers) accessible in read mode being possibly obtained by a control apparatus sending a command via the UHF channel, but the transmission of which is inhibited via the HF channel;
  a fourth state, called a complete deactivated state, in which the two HF and UHF parts are deactivated (HF "D", UHF "D"), with:
    no response on the UHF channel, whatever the command received via the UHF channel (restricted module C2);
    restricted operating mode A2 or B2 via the HF channel; the only command that can be interpreted by the HF channel is a command for reactivating the HF and UHF part;
    the value of the information field CH1 equal to a substitution identifier given with the command for deactivating the UHF part,
    the value of the information field CH2 equal to a substitution identifier given with a command for deactivating the HF part,
    the common data (user data, tag identifiers) completely inaccessible in read mode, the transmission of which is inhibited via the UHF channel and via the HF channel.

The possible transitions between these four states are the following.

When the tag is in the first state, it can:

either pass into the second state, following the reception of a command for deactivating the UHF part; the deactivating command can be sent via the UHF channel or via the HF channel, or pass into the third state following the reception of a command for deactivating the HF part; the deactivating command can be sent via the UHF channel or via the HF channel.

When the tag is in the second state (UHF part deactivated and completely mute) it can:

either pass into the first state, following the reception of a reactivation command for reactivating the UHF part, sent via the HF channel, or pass into the fourth state, following the reception of a command for deactivating the HF part, sent via the HF channel.

When the tag is in the third state (HF part deactivated and in restricted operating mode A2 or B2), it can:

either pass into the first state, following the reception of a command for reactivating the HF part, sent via the HF channel; optionally the reactivation part can also be sent via the UHF channel, or pass into the fourth state, following the reception of a command for deactivating the UHF part, sent via the UHF channel, the HF part processing only the reactivation commands in the restricted A2 or B2 modes.

When the tag is in the fourth state (UHF part deactivated and completely mute, HF part deactivated and in restricted working mode A2 or B2), it can:

either pass into the second state, following the reception of a command for reactivating the HF part, this command being sent via the HF channel, or pass into the third state, following the reception of a command for reactivating the UHF part, this command being sent via the HF channel.

In another variant of this second embodiment, it is possible to envisage a different definition of the restricted modes of operation A2, B2 relative to the commands effectively processed in this mode and to the way in which they are treated. It is possible, for example, to envisage responding to the restricted mode A2, B2 of the HF part, not only with a command for reactivating the HF part but also a command for UHF deactivation (this is the case of the passage from the third state into the fourth state). However, the higher the number of commands to which the card responds, the lower the level of protection of the tag against fraudulent use.

In another variant of this second embodiment, it is possible to envisage prohibiting the use of the UHF channel for the deactivation or the reactivation of the HF part and to authorize only the commands sent via the HF channel for the deactivation/reactivation of the HF part (this is the case where the passage from the first state into the third state or vice versa of FIG. 4 is not possible by UHF command). The HF channel then becomes an auxiliary channel of the UHF channel, making it possible to reactivate the UHF part when it is completely mute and being capable itself of having a restricted mode of operation.

As already described for the first particular embodiment of the invention, the commands for deactivating and reactivating comprise passwords respectively for deactivation/reactivation proper to the part to be deactivated/reactivated making it possible to validate the passages from an activated state to a deactivated state of a tag and vice versa. To this end, a deactivation/reactivation password given by the deactivation/reactivation proper to a part is compared with a deactivation/reactivation reference password proper to this part.

Besides, following the reception of a deactivation/reactivation command of a part, the values of the field CH1 or CH2 proper to the part to be deactivated/reactivated are updated, respectively with a substitution identifier proper to this part for the deactivated state and with a zero value for example for the activated state.

In addition, following the reception of a deactivation/reactivation command of a part, the rights of access to the user data proper to this part and to the tag identifier proper to this part are updated in order to prohibit/authorize read access to the data by the control apparatus, and the rights of response of the tag to the commands received via the channel associated with the part to be deactivated/reactivated are updated in order to prohibit/authorize the tag from responding to subsequent commands.

The invention claimed is:

1. A method for managing a mode of operation of an electronic tag, comprising at least one communications module to communicate with at least one control apparatus and a memory serving to store at least one tag identifier, proper to said tag, capable of being transmitted by the tag to said control apparatus, wherein the method comprises:

receiving a deactivation command; and deactivating, following reception of the deactivation command, during which said tag passes from an activated state to a deactivated state in which transmission, to said control apparatus, of said tag identifier is inhibited and in which said tag responds to a reactivation command by again authorizing transmission of said tag identifier to said control apparatus.

2. The method according to claim 1, wherein said deactivating comprises:

receiving said deactivation command comprising at least one status identifier, called a substitution identifier, and a deactivation password;

comparing said deactivation password with a reference deactivation password; and if comparing said deactivation password with a reference deactivation password is positive:

writing said substitution identifier to a field of data representing the deactivated or non-deactivated state of the tag; and updating rights of read and write accessibility of at least one part of said memory of said tag containing the tag identifier and updating rights of response of the tag to the commands received, applicable in the deactivated state of said tag.

3. The method according to claim 1, wherein deactivating comprises transmission, by said tag, of a reactivation password to an apparatus sending said deactivation command.

4. The method according to claim 2, wherein said substitution identifier is transmitted by the tag instead of said tag identifier in a response to a command received in the deactivated state.

5. The method according to claim 1, wherein the method comprises reactivating during which said tag passes from the deactivated state to the activated state, said reactivating comprising:

receiving said reactivation command comprising at least one reactivation password;

comparing said reactivation password with a reference reactivation password; and if comparing said reactivation password with a reference reactivation password is positive:

writing, to a data field representing the deactivated or non-deactivated state of the tag, of a value representing the activated state of said tag; and updating rights of accessibility in read and write mode of at least one part of said memory containing the tag identifier and updating rights of response of the tag to the received commands, applicable in the activated state of said tag.

6. The method according to claim 5, wherein said reactivating comprises transmission of a deactivation password by said tag to an apparatus sending said reactivation command.

7. The method according to claim 1, wherein said tag is configured to communicate via a first channel and via a second channel, said deactivation being a selective deactivation of a communications mode using the first channel and in which, in the deactivated state:

the transmission of said at least one tag identifier to said control apparatus is inhibited, via the first channel, and authorized via the second channel, and said tag responds to said reactivation command received via the second channel in again authorizing the transmission of said at least one tag identifier via the first channel.

8. The method according to claim 7, wherein said deactivating is triggered following reception of the deactivation command via the first channel or via the second channel.

9. The method according to claim 7, wherein, in the deactivated state, said tag responds to no command received via the first channel.

10. The method according to claim 7, wherein deactivating comprises:

receiving said deactivation command comprising at least one status identifier proper to the first channel, denoted as the first substitution identifier, and a deactivation password proper to the first channel;

comparing said deactivation password proper to the first channel with a reference deactivation password proper to the first channel; and if comparing said deactivation password proper to the first channel with a reference deactivation password proper to the first channel is positive:

writing said first substitution identifier to a data field representing the deactivated or non-deactivated state of the communications mode using the first channel; and updating rights of read and write accessibility of at least one part of said memory of said tag containing the first tag identifier and updating rights of response of the tag to the commands received via the first channel, applicable in the deactivated state.

11. The method according to claim 10, wherein the method comprises reactivating during which said tag passes from the deactivated state to the activated state, said reactivating comprising:

receiving said reactivation command sent via the second channel by said control apparatus, said reactivation command comprising at least one reactivation password proper to the first channel;

comparing said reactivation password proper to the first channel with a reference reactivation password proper to the first channel; and if said sub-step for comparing is positive:

writing a value representing the activated state of said tag to a data field representing the deactivated or non-deactivated state of the communications mode using the first channel; and updating the rights of read and write accessibility at least one part of said memory of said tag containing the first tag identifier, and updating the rights of response of the tag to the commands received via the first channel, applicable in the activated state of said tag.

12. The method according to claim 1, said memory serving to store also user data, liable to be transmitted by the tag to said control apparatus, wherein, in the deactivated state, the transmission to said control apparatus of said user data is inhibited.

13. An electronic tag comprising:

at least one communications module to communicate with at least one control apparatus, a memory serving to store at least one tag identifier proper to said tag, liable to be transmitted by the tag to said control apparatus, a deactivation module configured so that, following reception of a deactivation command, it makes the tag pass into a deactivated state by inhibiting transmission to said control apparatus of said at least one tag identifier, and a reactivation module configured so that, following reception of a reactivation command, it makes the tag pass into an activated state by authorizing transmission to said control apparatus of said at least one tag identifier.

14. The electronic tag according to claim 13, comprising at least one communications module to communicate via a first channel and via a second channel, the deactivation module being configured to make the tag pass into the deactivated state in inhibiting the transmission of said at least one tag identifier, via the first channel, to said control apparatus and in authorizing the transmission of said tag identifier, via the second channel, to said control apparatus, the reactivation module being configured so that, following the reception of said reactivation command received via the second channel, it makes the tag pass into the activated state in authorizing the transmission of said at least one tag identifier, via the first channel, to a-said control apparatus.

* * * * *

UNITED STATES PATENT AND TRADEMARK OFFICE
CERTIFICATE OF CORRECTION

PATENT NO. : 9,524,408 B2
APPLICATION NO. : 14/411810
DATED : December 20, 2016
INVENTOR(S) : Caroline Fenzy Peyre et al.

Page 1 of 1

It is certified that error appears in the above-identified patent and that said Letters Patent is hereby corrected as shown below:

In the Specification

Column 18, Line 53, after "to", delete "a-"

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*